United States Patent [19]
Clyne et al.

[11] 4,127,161
[45] Nov. 28, 1978

[54] ENERGY STORAGE UNIT AND SYSTEM

[75] Inventors: Arthur J. Clyne, Alma; John E. Knarr, Lansing; Stanley Miller, Alma, all of Mich.

[73] Assignee: Energy Recycling Company, Lansing, Mich.

[21] Appl. No.: 773,714

[22] Filed: Mar. 2, 1977

[51] Int. Cl.² ............................................. F28D 21/00
[52] U.S. Cl. ................................ 165/34; 165/104 S; 126/400
[58] Field of Search ............. 165/104 S, 34; 126/400, 126/271

[56] References Cited

U.S. PATENT DOCUMENTS

| | | | |
|---|---|---|---|
| 3,029,596 | 4/1962 | Hanold et al. | 126/400 X |
| 3,069,527 | 12/1962 | Kovacik | 165/DIG. 4 |
| 3,289,743 | 12/1966 | Biro | 165/104 S |
| 3,977,197 | 8/1976 | Brantley, Jr. | 165/10 X |
| 4,037,579 | 7/1977 | Chubb | 165/104 S X |

FOREIGN PATENT DOCUMENTS 1,344,486  1/1974  United Kingdom ................. 165/104 S Primary Examiner—Albert W. Davis, Jr.
Attorney, Agent, or Firm—Griffin, Branigan and Butler

[57] ABSTRACT

A heat storage unit in the form of a cylinder is provided with a removable end closure, and contains a plurality of closed tubes holding a heat storage substance, the tubes being supported at either end thereof by screens. A transfer fluid flows from one end of the cylinder to the other between tubes for transfer of heat. A heat storage system is provided by the combination of a plurality of units, the units containing heat storage substances of various melting temperatures, thereby providing for the storing of heat as the latent heat of fusion at several temperature levels.

19 Claims, 5 Drawing Figures

ENERGY STORAGE UNIT AND SYSTEM

BACKGROUND OF THE INVENTION

The present invention relates to heat storage systems, particularly systems for storing solar energy. Other applications include the conservation of heat energy by recycling discharged heat.

Several heat storage systems are available which store heat in the form of the latent heat of fusion. An example of such a system is found in U.S. Pat. No. 2,677,243 to Telkes. In such a system, a heat transfer fluid is passed over containers which contain special heat storage substances. These substances are selected to have a melting point less than the prime heat source and equal to a desired output temperature. Such systems have several advantages over non-fusion type systems. For one, any substance has its greatest heat storing capacity at the melting temperature because a much greater amount of heat is required to melt a substance at its constant melting temperature than is required to raise the temperature of a solid or liquid several degrees. Hence, when the temperature of the substance must pass through the melting temperature in order to reach a higher transfer fluid temperature a large amount of heat will be absorbed and thus stored as latent heat of fusion.

Another advantage of fusion type systems is that the bulk of the heat stored in the substance will be retrieved at the constant melting temperature. Hence, as was suggested by Telkes, a storage substance can be selected such that its melting temperature is at the desired output temperature.

One disadvantage of prior systems is that, with time, the storage substance inevitably breaks down so that subsequently relatively little heat can be stored therein. Prior storage units were simply disposed of after breakdown or sent back to the manufacturer for costly refurbishing.

Another disadvantage of prior systems was the lack of flexibility. In past systems, with changes in heat source or heat requirements a heat storage system could be rendered useless, requiring complete replacement. Nor could a system be controlled to provide one temperature output over one period of time and another temperature output over another period of time.

Still another disadvantage of prior art systems is that the heat transfer fluid must have a temperature greater than the melting temperature of the storage substance in order to store a substantial amount of heat. Hence, if the source temperature varied, it might be necessary to store at a lower temperature than might be desirable in order to absorb heat over a longer period within the varying heat cycle. In order to store more heat at this lower temperature level, larger units were required. An example of this problem can be found in a solar heating system wherein the heat source might vary from unusable temperatures at night to 300° F. or higher during the day. If a storage medium having a melting temperature at 250° F. were used, the storage system could be used as a high temperature output source, but because of the short period during which fluid at a temperature greater than 250° F. would be available, exceptionally large and efficient solar collectors would be required in order to supply a sufficient amount of heat to activate the storage system. On the other hand, if the melting temperature of the storage medium were set at 100°, heat could be transferred into the storage system over a greater period; however, the temperature might not be sufficient for such output uses as home heating and laundry.

SUMMARY OF THE INVENTION

It is an object of this invention to provide a heat storage unit which allows for easy replacement of the storage substance.

It is another object of this invention to provide a storage unit which allows for a greater flexibility in choosing the output temperature.

It is another object of this invention to provide a heat storage system which provides for greater efficiency than prior fusion type systems while permitting the storage of heat at varying temperatures and in greater volume than has herebefore been feasible.

It is yet another advantage of this invention to provide a heat storage system which may be controlled to give varying temperature outputs.

The foregoing and other objects, features, and advantages of the invention will be apparent from the following more particular description of the preferred embodiments of the invention, as illustrated in the accompanying drawings in which like reference characters refer to the same parts throughout the different views. The drawings are not necessarily to scale, emphasis instead being placed upon illustrating the principles of the invention.

In accordance with the principles of the present invention, a heat storage unit comprises a substantially closed container having a closure substantially covering one end thereof. A plurality of heat storage containers are supported at each end by a planar support adapted to permit the flow of heat transfer fluid therethrough.

A heat transfer storage system is provided in which containers having heat storage substances of varying melting temperatures are positioned in a heat transfer fluid passage.

According to another aspect of the invention, the heat storage system is modular in construction and several units at one temperature may be placed in series for increased capacity and several units of different operating temperatures may be placed in parallel for greater efficiency and capacity.

DESCRIPTION OF PREFERRED EMBODIMENTS OF THE INVENTION

Figure 1:
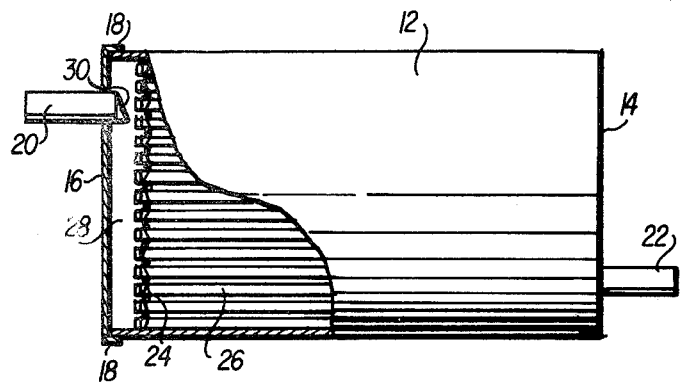
FIG. 1 is a side view, partially broken away, of a heat storage unit in accordance with the invention.
Figure 2:
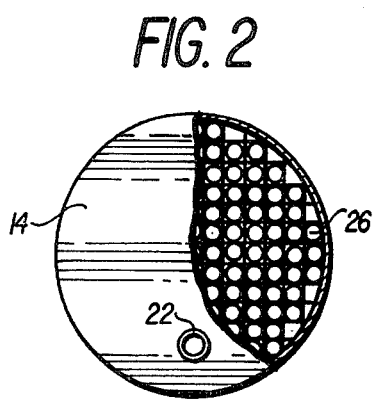
FIG. 2 is an end view, partially broken away, of the heat storage unit of FIG. 1.
Figure 3:
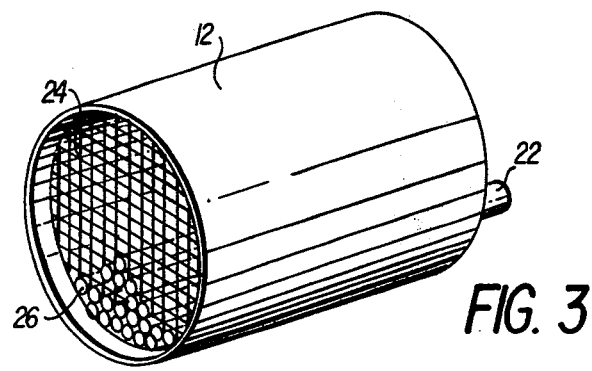
FIG. 3 is an isometric view of the heat storage unit of FIG. 1, partially filled with containers and with the end closure removed.

The basic heat storage unit of the invention is shown in FIGS. 1 through 3. It comprises a cylindrical housing 12 having a sealed end 14 and a removable end closure 16. When in use, the end closure 16 is mounted to the cylinder 12 by fasteners 18. To prevent leakage of heat transfer fluid, a gasket is used between the closure 16 and cylinder 12. A fluid flow inlet pipe 20 is fixed to the end closure 16 and an outlet pipe 22 is fixed to end plate 14.

A planar support member, shown as screen 24 in FIG. 3, is provided adjacent and parallel to each end plate of the unit. These screens are fixed within the cylinder for supporting heat storage containers. These containers 26 are in the form of closed tubes. The tubes are individually removable from the unit and an access plug is provided at one end of each tube so that a heat storage substance contained therein can be easily replaced.

Suitable insulation, not shown, covers the entire cylinder.

Referring to FIG. 1, when in use, a heat transfer fluid will be directed from inlet pipe 20 into space 28 by a fluid flow director 30. Deflector 30 has holes therein so that while some fluid is deflected downwardly, other fluid is diffused into the space above the deflector. The fluid will then pass through screen 24 and flow around the heat storage tubes 26 toward outlet pipe 22. It should be noted that screen 24 serves the dual purpose of supporting the heat storage tubes and diffusing the heat transfer fluid.

If a heat transfer fluid having a temperature greater than the melting point of the heat storage substance within each tube passes through the unit heat will be transferred to the heat storage substance, melting the substance. Heat will then be stored as latent heat of fusion until a cooler heat transfer fluid flows through the system. At such time, the heat storage substance will solidify, transferring the heat of fusion into the heat transfer fluid.

A number of substances are available for use as the heat storage medium. Telkes suggested a number of eutectic salts in the above-mentioned patent. These salts are useful in lower temperature applications; however, they have a tendency to break down over a protracted period and where higher temperature fluid is used.

A preferred storage medium is a paraffin such as that manufactured by Union Oil of California and distributed by Witco Chemical and others. The most common melting points are at intervals between 135° F. and 190° F.; however, the paraffin can be manufactured to have various melting points over a larger temperature range. It should be noted that even this preferred storage substance will break down with extended use.

As the transfer fluid, water may be suitable in some applications; however, impurities in the water may cause it to become extremely corrosive and the system must be pressurized if the system is to operate at temperatures over 212° F. A preferred fluid is manufactured by Dow Chemical under the trademark "DOWTHERM J". This fluid is very stable, will not break down over a broad temperature spectrum, and has low heat expansion.

As has already been noted, when the storage medium breaks down with age, with the present invention the end closure 16 need only be removed and each tube be replaced or refilled. Also, where operating temperature requirements change, the tubes or storage medium therein can be replaced to provide a storage medium which operates at a different temperature.

Another advantage of the present device is that any sediment which collects in the storage unit can easily be cleaned out when the end closure is removed and, if necessary, the containers are removed.

Figure 4:
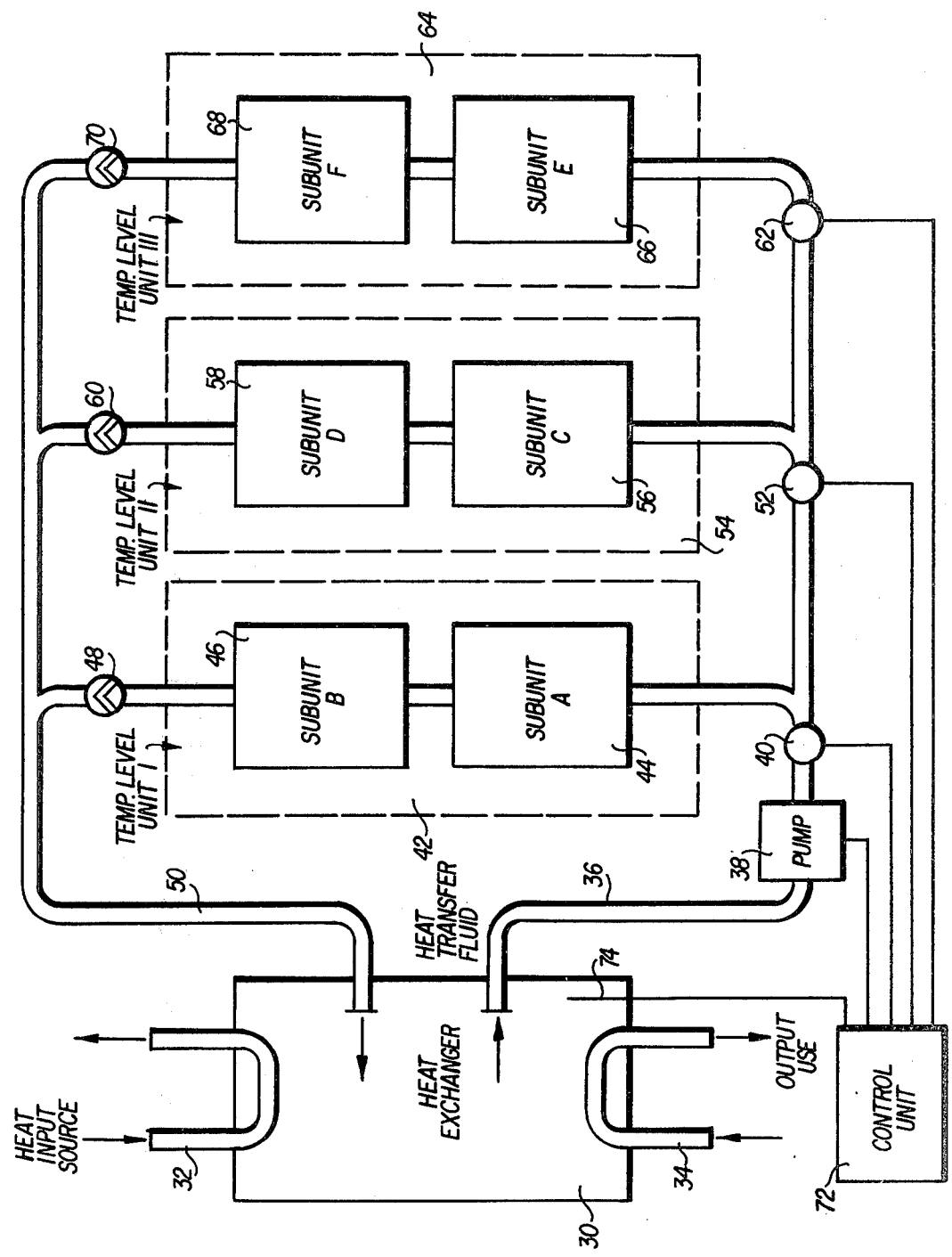
FIG. 4 is a fluid circuit diagram of a heat storage system in accordance with the invention.

Referring now to FIG. 4, a preferred heat storage system, which may use a number of the units shown in FIG. 1, will be described.

The source of heat to the transfer fluid is a heat exchanger 30. Heat will be transferred into the heat exchanger by a fluid flowing through pipe 32 which may include a coil or the like within the heat exchanger. Pipe 32 may be connected to a solar collector or any other source of heat. Heat can be taken from the storage system by a fluid flowing through pipe 34, which may also include a heat exchanger coil.

Once heat transfer fluid has been either heated by fluid in pipe 32 or cooled by fluid in pipe 34, it can be drawn into pipe 36 by a pump 38. A valve 40 controls the flow of fluid into a first temperature level unit 42. Unit 42 may comprise one heat storage unit shown in FIG. 1 or a number of such units placed in series. Shown are two units 44 and 46. After passing through units 44 and 46, a fluid will pass through check valve 48 into pipe 50 which directs the fluid back into the heat exchanger.

A second valve 52 can be opened to permit flow of fluid into a second temperature level unit 54. Again, this unit may include any number of subunits. Two such units 56 and 58 are shown. The heat storage substance in units 56 and 58 will have a single melting temperature greater than the melting temperature of substance found in units 44 and 46. A check valve 60 is provided between unit 54 and pipe 50.

A third valve 62 permits flow of fluid through a unit 64 having an even higher melting temperature. Again, two subunits 66 and 68 are shown in series, but any number of subunits could be used. A check valve 70 is provided.

Pump 38 and valves 40, 52, and 62 are controlled by a central control unit 72 which is responsive to a thermocouple 74.

The system shown in FIG. 4 will operate automatically to store heat when the heat input to the heat exchanger 30 from heat pipe 32 exceeds the heat output to pipe 34. The system will also automatically remove heat from the storage system when the output of heat from the heat exchanger exceeds the input.

To understand the operation of the system in FIG. 4, first assume that the heat transfer fluid in heat exchanger 30 is cool and that no heat is stored in the system. At this point, control unit 72 will act to close all valves and shut off the pump, thereby preventing heat transfer fluid flow through the system. With an input of heat from pipe 32 greater than the output through pipe 34, the temperature of heat transfer fluid in the heat exchanger will increase. As this temperature reaches a predetermined level and before it approaches the melting temperature of the heat storage substance found in unit 42, valve 40 will be opened and pump 38 will be turned on to cause a flow of heat transfer fluid through the unit. As the transfer fluid heats up beyond the melting point of the storage substance found in unit 42, heat will be transferred from the fluid into the substance, thereby melting the substance. Heat will thus be stored within the substance as latent heat of fusion. When the storage substance in both subunits 44 and 46 has completely melted, these units will be completely charged.

It should be noted that with proper design of individual storage units, unit 44 will almost completely charge before unit 46 begins to charge. This is because, with the large heat transfer area provided by tubes 26, the temperature of the heat transfer fluid will drop from above to below the melting temperature as it passes through the first unit 44. Once unit 44 has completely charged, little heat will be absorbed and a hot transfer fluid will be received by unit 46. This natural consequence has the advantage of reducing the heat transfer out of a partially charged system. If both units 44 and 46 were to charge simultaneously, a greater surface area would be subject to heat loss. In the present system with the unit 42 only half charged, little heat will be stored in subunit 46 and thus only a small amount of heat will be lost from that unit. As the temperature of subunit 44 will remain constant during the entire fusion process, the heat differential between subunit 44 and the environment will not change during fusion and thus heat loss remains constant. Of course, the above description relates to an ideal situation, and the level of achievement will depend upon the efficiency of design.

So long as the temperature of the heat transfer fluid remains at or above the melting temperature of unit 42, valve 40 will remain open. If the heat transfer fluid temperature continues to increase, valve 52 will open as the temperature approaches the melting temperature of unit 54. Unit 54 will then charge in the same manner as did unit 42.

Similarly, valve 62 will open as the temperature of transfer fluid approaches the melting temperature of unit 64. Additional units may be added as desired to increase the flexibility and efficency of the system over a given temperature range. It can also be understood that with this modular construction, the capacity of each unit could be increased to meet any application. Hence, if the source provides a great deal of heat at temperature level 2 but only a small amount of heat at temperature level 3, temperature level 2 may include several subunits whereas temperature level 3 would only include one or two subunits. By so constructing the system for each individual application, the most efficient system can be designed.

Thus far, the charging of the heat storage system has been described. It should be understood that heat may be extracted from the storage system automatically without changing the controls of valves 40, 52, and 62. As the output requirement of heat from heat exchanger 30 exceeds the input, the temperature of the heat transfer fluid will tend to decrease. As the temperature drops below the melting temperature of the substance in unit 64 that substance will solidify, thereby releasing the stored heat of fusion. Once the substance in unit 64 has completely solidified, the temperature of heat transfer fluid will continue to drop and valve 62 will automatically close at a predetermined temperature level. Heat transfer fluid will, however, continue to flow through units 42 and 54. When the temperature drops below the melting temperature of unit 54, the heat storage substance of that unit will begin to solidify, releasing the heat of fusion which eventually passes to the fluid in pipe 34.

Once the substance in unit 54 has completely solidified, the temperature of the heat transfer fluid will steadily drop to the temperature of unit 42 and valve 52 will thus be turned off. Finally, so long as the heat output from the heat exchanger exceeds the input, unit 42 will discharge.

From the above description, it can be understood that the use of several heat storage units having different melting temperatures permits the storage of heat over a wide range of input temperatures while still permitting storage of at least some heat at the maximum input temperature. Each unit will operater at its most efficient point, that is, at its melting temperature, and heat will always be stored at the highest temperature available from the heat transfer fluid at any given time.

It should further be understood that the system shown in FIG. 4 can be controlled automatically or manually as an application requires. Consider, for example, a system in which both the heat input and heat output have been shut down while the storage system is completely charged. It would then be wise to close all the valves and turn off pump 38 despite the high temperature of fluid in heat exchanger 30. The heat may then be stored in the fully charged unit for an extended period of time.

If at a later time it was necessary to extract heat from the system without adding to it from a heat source, it may be that the fluid in the heat exchanger will have cooled down below any of the valve turn-on points. In this situation, it might be necessary to install an externally activated switch such as a timer or thermostat, or to manually open the valves and turn on pump 38. The temperature of the transfer fluid would have to be heated up to the melting temperature of unit 64 before the system would continue to operate automatically. Rather than opening all valves, however, it might be preferable to first preheat the fluid by passing it through unit 42, thereby conserving heat stored at the higher temperature of unit 64. Once the heat transfer fluid has been raised to the melting temperature of unit 42, valve 52 could be manually opened and so on. Once the fluid has reached the temperature of unit 64, it could continue to operate automatically as described above.

Figure 5:
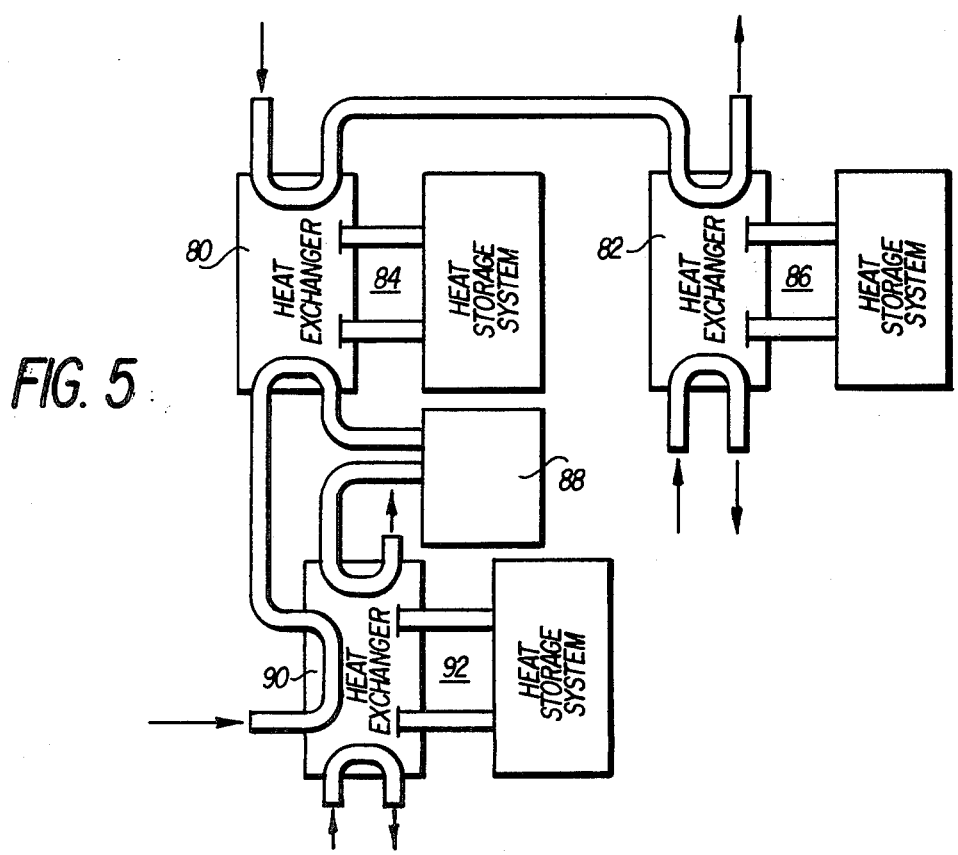
FIG. 5 shows a heat storage system combining several of the systems shown in FIG. 4.

The unit of FIGS. 1 through 3 and the system of FIG. 4 can be used as building blocks in various larger systems using several heat exchangers. As shown in FIG. 5, heat from a single heat source may be transferred into two heat exchangers 80 and 82 in heat storage systems 84 and 86. Heat storage system 84 might store at a very high temperature level for use in a high temperature application 88. Application 88 may be, for example, a heat pump, absorbtion type air conditioner or a commercial laundry system. Heat storage system 86 would have a lesser maximum temperature capacity and could be used for lower temperature systems, as for example domestic hot water taps.

The discharge water from laundry system 88 will be water still at a very high temperature, the heat of which is ordinarily lost. In the system shown, the discharge is passed through a third heat exchanger 90 of a third heat storage system 92. The heat extracted from the discharge could be stored and used to preheat cold water which enters heat exchanger 80 or for additional applications, as for example, to supplement the output from heat exchanger 82.

While the invention has been particularly shown and described with reference to preferred embodiments thereof, it will be understood by those skilled in the art that various changes in form and detail may be made therein without departing from the spirit and scope of the invention as defined by the appended claims.

We claim:

1. A heat storage system of the type in which heat from a heat transfer fluid is transferred to a heat storage substance when the transfer fluid temperature is greater than the melting temperature of the storage substance such that heat is stored in the substance as heat of fusion, and wherein heat is transferred from said substance to the transfer fluid when the transfer fluid temperature is less than the melting temperature of the substance, said heat storage system comprising:

at least two heat storage container means positioned in heat transfer relationship with a heat transfer fluid flow passage, each heat storage container means having a heat storage substance therein, the heat storage substance in each container means being selected such that the melting temperature of the heat storage substance in each container means will be less than the expected high temperature of the heat transfer fluid in the system and greater than the expected low temperature of the heat transfer fluid, a first of said container means having therein a heat storage substance of a first melting temperature and a second of said container means having therein a heat storage substance of a second melting temperature other than said first melting temperature, and a source of said heat transfer fluid and means for causing the heat transfer fluid to flow from said source through the heat storage fluid flow passage such that heat of a first temperature will be stored as heat of fusion in said first container means and heat of a second temperature will be stored as heat of fusion in said second container means said first container means being supported in a first heat storage unit of a first temperature level forming a portion of said fluid passage, and said second container means being supported in a second heat storage unit of a second temperature level higher than the first level forming a second portion of the heat transfer fluid passage, said first and second portions of the fluid flow passage having a parallel fluid flow relationship, said source of heat transfer fluid being a heat exchanger, and said heat storage system further comprising a first valve between the heat exchanger and said first and second portions of the heat transfer fluid flow passage and a second valve between said first and second portions of said heat transfer fluid flow passage, such that when said first valve is closed, fluid will not flow through either of said portions of the fluid flow passage, and when said first valve is opened and said second valve is closed, fluid will flow through said first portion but not said second portion, and when both of the valves are open, fluid will flow through both portions of the fluid flow passage.

2. The heat storage system of claim 1, further comprising control means for controlling said first and second valves, said control means opening the first valve when the heat transfer fluid is at about the same temperature as said first temperature level, the control means holding the first valve open until the heat transfer fluid temperature drops below the first temperature level, and the control means opening the second valve when the heat transfer fluid temperature is at about the second temperature level, the control means holding the second valve open until the heat transfer fluid temperature drops below the first temperature level.

3. The heat storage system of claim 2 wherein the system is of a modular construction such that additional units at additional temperature levels may be placed parallel to said first and second units with a valve positioned between said unit.

4. The heat storage system of claim 1 wherein the system is of a modular construction such that additional units at additional temperature levels may be placed parallel to said first and second units with a valve positioned between each unit.

5. The heat storage system of claim 1 wherein each unit comprises at least one modular sub-unit, each sub-unit within a unit being in an in-series fluid flow relationship and operating at substantially the same temperature.

6. The heat storage system of claim 5 wherein the system is of a modular construction such that additional units at additional temperature levels may be placed parallel to said first and second units with a valve positioned between each unit.

7. The heat storage system of claim 6 wherein each sub-unit comprises a substantially closed housing having first and second substantially parallel ends; a closure element forming substantially an entire end thereof; a fluid inlet and outlet at respective ends; at least two planar support means having a plurality of holes therein mounted within said housing and parallel and adjacent to each end of said housing; and a plurality of elongated heat storage substance containers, each container extending through one hole in each support member and supported thereby.

8. The heat storage system of claim 7 wherein said housing is a cylinder and each elongated heat storage container is a closed tube.

9. The heat storage system of claim 8 wherein said planar support member is a screen.

10. The heat storage system of claim 8 wherein each heat storage container tube has a closure element at one end thereof.

11. A heat storage system of the type in which heat from a heat transfer fluid is stored in a heat storage substance as heat of fusion, and wherein heat is transferred from said substance to the heat transfer fluid when the transfer fluid temperature is less than the temperature of the substance, said heat storage system comprising:

a source of heat transfer fluid having an input and an output;

means defining a flow path from said output to said input of said source, said means including means forming first and second parallel branches for the flow of the heat transfer fluid from said output to said input;

first and second heat storage means disposed in heat exchange relationship with said heat transfer fluid in said first and second parallel branches, respectively;

a heat storage substance disposed in each said heat storage means and having a melting temperature less than the expected high temperature of said heat transfer fluid and greater than the expected low temperature of said heat transfer fluid;

control means for selectively controlling the flow of heat transfer fluid through said first and second parallel branches; and means for sensing the temperature of said heat transfer fluid, said control means including first means responsive to said temperature sensing means for directing flow of said heat transfer fluid from said source through said first parallel branch when the temperature sensed does not exceed a predetermined temperature T higher than the melting temperature of the heat storage substance in said first heat storage means;

said control means including second means responsive to said temperature sensing means for permitting flow of said heat transfer fluid from said source through said second parallel branch when the temperature sensed does exceed said predetermined temperature T.

12. A heat storage system as claimed in claim 11 wherein the heat storage substances in said first and second heat storage means are different substances having different melting temperatures, the substance in said second heat storage container having a melting temperature at least as great as said predetermined temperature T.

13. The heat storage system of claim 12 wherein said first and said second heat storage means each comprises a substantially closed housing having first and second substantially parallel ends; a removable closure element forming substantially an entire end thereof; a fluid inlet and outlet at respective ends; at least two planar support means having a plurality of holes therein mounted within said housing and parallel and adjacent to each end of said housing; and a plurality of elongated heat storage substance containers, each container extending through one hole in each support member and supported thereby.

14. The heat storage system of claim 13 wherein said housing is a cylinder and each elongated heat storage container is a closed tube.

15. The heat storage system of claim 14 wherein said planar support member is a screen.

16. The heat storage system of claim 14 wherein each heat storage container tube has a closure element at one end thereof.

17. A heat storage system as claimed in claim 11 wherein the heat storage substances in said first and second storage means are the same type of substance having the same melting temperatures.

18. A heat storage system as claimed in claim 11 wherein said source of heat transfer fluid is a heat exchange unit.

19. A heat storage system as claimed in claim 11 wherein said source of heat transfer fluid includes means for heating said heat transfer fluid.

* * * * *